(12) United States Patent
Ayzenberg et al.

(10) Patent No.: US 10,140,053 B1
(45) Date of Patent: Nov. 27, 2018

(54) LOAD BALANCING OF MULTI-COPY DATA REPLICATION

(71) Applicant: EMC IP Holding Company LLC, Hopkinton, MA (US)

(72) Inventors: Lev Ayzenberg, Petah Tikva (IL); Leehod Baruch, Rishon Leziyon (IL); Valerie Lotosh, Ramat Gan (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 106 days.

(21) Appl. No.: 15/275,754

(22) Filed: Sep. 26, 2016

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 15/173* | (2006.01) |
| *G06F 11/07* | (2006.01) |

(52) U.S. Cl.
CPC .............. *G06F 3/065* (2013.01); *G06F 3/067* (2013.01); *G06F 3/0619* (2013.01); *G06F 3/0659* (2013.01); *G06F 11/0709* (2013.01); *G06F 15/17331* (2013.01)

(58) Field of Classification Search
CPC . G06F 3/067; G06F 11/0709; G06F 15/17331
USPC .......................................................... 711/165
See application file for complete search history.

(56) References Cited

U.S. PATENT DOCUMENTS

| | | | |
|---|---|---|---|
| 8,478,955 B1 | 7/2013 | Natanzon et al. | |
| 2004/0193945 A1* | 9/2004 | Eguchi | G06F 11/142 714/6.1 |
| 2004/0221149 A1* | 11/2004 | Rao | G06F 11/1435 713/2 |
| 2006/0200506 A1* | 9/2006 | Desimone | G06F 3/0607 |

* cited by examiner

*Primary Examiner* — Edward J Dudek, Jr.
*Assistant Examiner* — Sidney Li
(74) *Attorney, Agent, or Firm* — Daly, Crowley Mofford & Durkee, LLP

(57) ABSTRACT

A computer program product, system, and method for generating coded fragments comprises receiving, at a primary data protection appliance (DPA), an I/O write for a user volume; determining a distributed consistency group (DCG) associated with the user volume, the DCG having a plurality of replica copies; determining one or more secondary DPAs assigned to one or more of the replica copies; sending the I/O write from the primary DPA to each of the secondary DPAs; and applying, at each of the secondary DPAs, the I/O write to at least one of the replica copies assigned to the secondary DPA.

18 Claims, 5 Drawing Sheets

LOAD BALANCING OF MULTI-COPY DATA REPLICATION

BACKGROUND

Computer data is vital to today's organizations, and a significant part of protection against disasters is focused on data protection. As solid-state memory has advanced to the point where cost of memory has become a relatively insignificant factor, organizations may afford to operate with systems that store and process terabytes of data.

Some data protection systems provide data replication, by creating a copy of an organization's production site data on a secondary backup storage system, and updating the backup with changes. Data replication systems generally operate either at the application level, at the file system level, or at the data block level. Continuous data protection systems can enable an organization to roll back to specific points in time. Some continuous data protection systems use a technology referred to as "journaling," whereby a log is kept of changes made to the backup storage.

One challenge to continuous data protection is the ability to keep pace with writes (e.g., I/Os or data transactions) occurring at the production site without slowing down the production site. The overhead of journaling may require several writes at the backup site for each write at the production site. As such, when writes occur at a high rate at the production site, the backup site may not be able to finish backing up one write before the next production site write occurs.

U.S. Pat. No. 8,478,955 issued on Jul. 2, 2013 and entitled "VIRTUALIZED CONSISTENCY GROUP USING MORE THAN ONE DATA PROTECTION APPLIANCE," which is hereby incorporated by reference in its entirety, describes one approach for distributing writes in a continuous replication environment.

SUMMARY

According to one aspect of the disclosure, a method comprises: receiving, at a primary data protection appliance (DPA), an I/O write for a user volume; determining a distributed consistency group (DCG) associated with the user volume, the DCG having a plurality of replica copies; determining one or more secondary DPAs assigned to one or more of the replica copies; sending the I/O write from the primary DPA to each of the secondary DPAs; and applying, at each of the secondary DPAs, the I/O write to at least one of the replica copies assigned to the secondary DPA.

In various embodiments, applying, at each of the secondary DPAs, the I/O write to at least one of the replica copies comprise adding the I/O write to a journal. In one embodiment, receiving an I/O write for a user volume comprises receiving an I/O write from a splitter. In certain embodiments, the method further comprises determining one or more of the replica copies assigned to the primary DPA; and applying, at the primary DPA, the I/O write to the one or more replica copies assigned to the primary DPA.

In some embodiments, the DCG includes N replica copies and wherein determining one or more secondary DPAs assigned to one or more of the replica copies comprises determine N−1 secondary DPAs each assigned to one of the replica copies. In certain embodiments, the method further comprises sending the I/O write from a least one of the secondary DPAs to a remote DPA.

According to another aspect of the disclosure, a system comprises one or more processors, a volatile memory, and a non-volatile memory storing computer program code that when executed on the processor causes execution across the one or more processors of a process operable to perform embodiments of the method described hereinabove.

According to yet another aspect of the disclosure, a computer program product tangibly embodied in a non-transitory computer-readable medium, the computer-readable medium storing program instructions that are executable to perform embodiments of the method described hereinabove.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
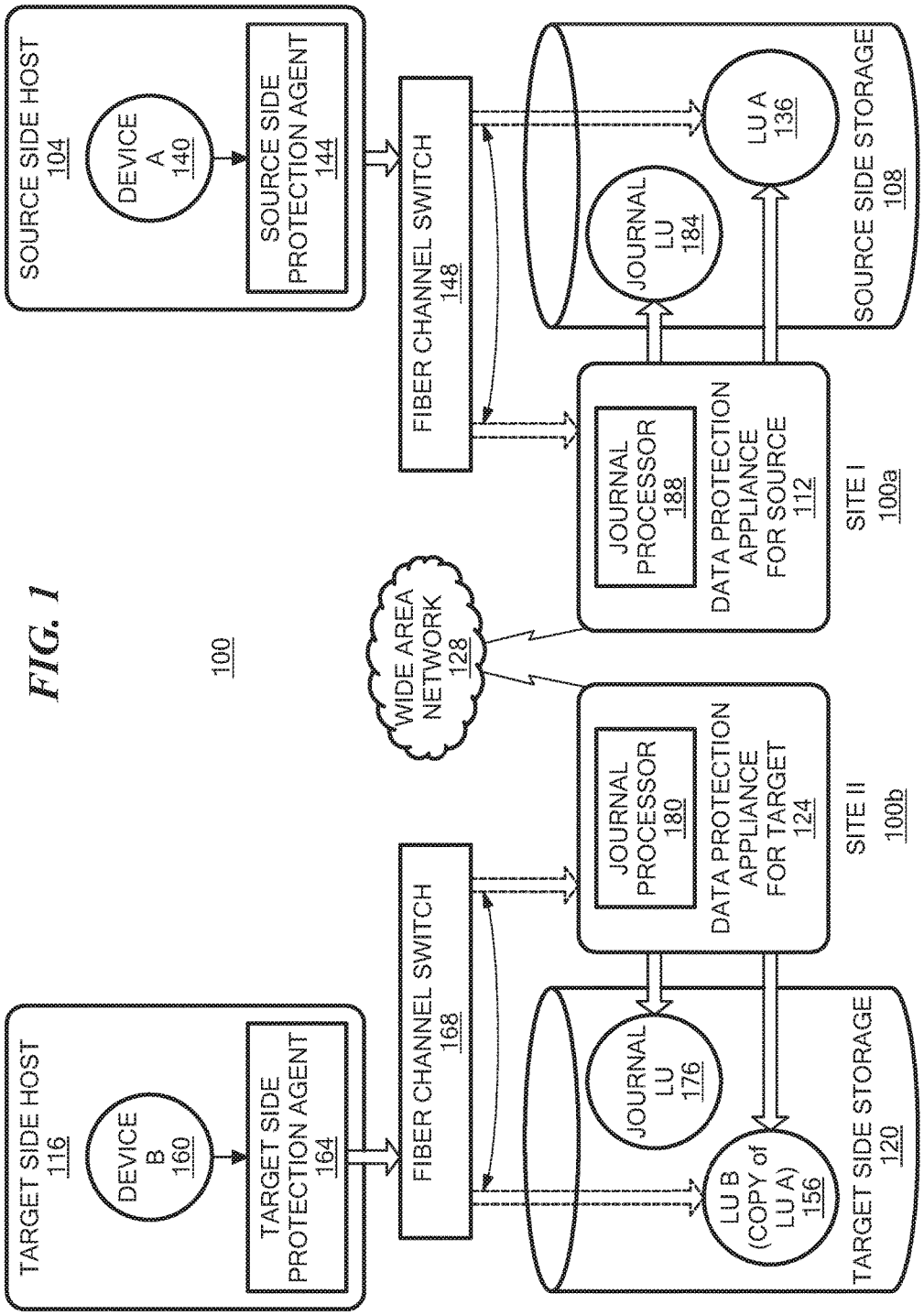
FIG. 1 is a block diagram of a data protection system, according to one embodiment of the disclosure.

Referring to the embodiment of FIG. 1, a data protection system 100 includes two sites: Site I 100*a* and Site II 100*b*. Under normal operation Site I 100*a* may correspond to a source side (i.e., the transmitter within a data replication workflow) of system 100 and Site II 100*b* may be the target side (i.e., the receiver within a data replication workflow) of the system, as shown in FIG. 1. Thus, during normal operations, the direction of replicate data flow may go from Site I 100*a* to Site II 100*b*.

In certain embodiments, Site I and Site II may be remote from one another. In other embodiments, the two sites may be local to one another. In particular embodiments, Site I and Site II may be connected via a local area network (LAN). In other embodiments, the two sites may be connected via a wide area network (WAN), such as the Internet.

In particular embodiments, the data protection system may include a failover mode of operation, wherein the direction of replicated data flow is reversed. In such embodiments, Site I may behave as a target side and Site II may behave as the source side. In some embodiments, failover may be triggered manually (e.g., by a user) or automatically. In many embodiments, failover may be performed in the event of a disaster at Site I. In some embodiments, both Site I and Site II may behave as source side for some stored data and may behave simultaneously as a target site for other stored data. In certain embodiments, a portion of stored data may be replicated from one site to the other, and another portion may not be replicated.

In some embodiments, Site I corresponds to a production site (e.g., a facility where one or more hosts run data processing applications that write data to a storage system and read data from the storage system) and Site II corresponds to a backup or replica site (e.g., a facility where replicated production site data is stored). In such embodiments, Site II may be responsible for replicating production site data and may enable rollback of Site I data to an earlier point in time. In many embodiments, rollback may be used in the event of data corruption of a disaster, or alternatively in order to view or to access data from an earlier point in time.

Referring again to FIG. 1, Site I 100a includes a source host 104, a source storage system (or "storage array") 108, and a source data protection appliance (DPA) 112 coupled via a first storage area network (SAN). Similarly, Site II 100b includes a target host 116, a target storage system 120, and a target DPA 124 coupled via a second SAN. Each SAN may include one or more devices (or "nodes") that may be designated an "initiator," a "target", or both. In the embodiment of FIG. 1, the first SAN includes a first fiber channel switch 148 and the second SAN includes a second fiber channel switch 168. Communication links between each host 104, 116 and its corresponding storage system 108, 120 may be any appropriate medium suitable for data transfer, such as fiber communication channel links. In many embodiments, a host communicates with its corresponding storage system using SCSI commands.

Referring back to FIG. 1, hosts 104 and 116 may each correspond to one computer, a plurality of computers, or a network of distributed computers. In some embodiments, a host may include a processor, volatile memory, non-volatile memory, a data bus, an I/O interface, a display interface and a network interface. In certain embodiments, a host may run at least one data processing application, such as a database application and an e-mail server.

Referring again to FIG. 1, each storage system 108, 120 may include storage devices for storing data, such as disks or arrays of disks. In some embodiments, the storage systems may be target nodes. In certain embodiments, in order to enable initiators to send requests to a storage system, the storage system may expose one or more logical units (LU) to which commands are issued. In many embodiments, the storage systems may be SAN entities that provide multiple LUs for access by multiple SAN initiators. In many embodiments, an LU is a physical or virtual logical entity provided by a storage system for accessing data stored therein. In some embodiments, an LU may be a virtual disk accessed by a virtual machine. In certain embodiments, an LU may be identified by a unique logical unit number (LUN).

In the embodiment of FIG. 1, storage system 108 exposes a logical unit 136, designated as LU A, and storage system 120 exposes a logical unit 156, designated as LU B. LU B may be used for replicating LU A. As such, LU B may be generated as a copy of LU A. In one embodiment, LU B may be configured so that its size is identical to the size of LU A.

Referring back to FIG. 1, the source host 104 generates a host device 140 ("Device A") corresponding to LU A and the source host 116 generates a host device 160 ("Device B") corresponding to LU B. In many embodiments, a host device is a logical entity within a host through which the host may access a LU. In some embodiments, an operating system of a host may generate a host device for each logical unit exposed by a storage system in the host SAN.

Referring again to FIG. 1, the source host 104 is configured to act as a SAN initiator that issues I/O requests through host device 140 to LU 136 ("LU A"). In some embodiments, the I/O requests include SCSI commands. In many embodiments, an I/O request includes an address that includes a specific device identifier, an offset within the device, and a data size.

Referring back to FIG. 1, the source DPA 112 and target DPA 124 may perform various data protection services, such as data replication of a storage system, and journaling of I/O requests issued by the hosts 104, 116. When acting as a target DPA, a DPA may also enable rollback of data to an earlier point-in-time (PIT), and processing of rolled back data at the target site. Each DPA 112, 124 may be a physical device, a virtual device running, or may be a combination of a virtual and physical device.

In some embodiments, a DPA may be a cluster of such computers. In many embodiments, a cluster may ensure that if a DPA computer is down, then the DPA functionality switches over to another computer. In some embodiments, computers within a DPA cluster may communicate with one another using at least one communication link suitable for data transfer via fiber channel or IP based protocols, or such other transfer protocol. In certain embodiments, one computer from the DPA cluster may serve as the DPA leader that coordinates other computers in the cluster, and may also perform other tasks that require coordination between the computers, such as load balancing.

In certain embodiments, a DPA may be a standalone device integrated within a SAN. In other embodiments, a DPA may be integrated into a storage system. For example, referring to FIG. 3, source DPA 112 may receive I/Os from storage system 108. In some embodiments, the DPAs communicate with their respective hosts through communication lines such as fiber channels using, for example, SCSI commands or any other protocol.

In various embodiments, the DPAs may be configured to act as initiators in the SAN. For example, the DPAs may issue I/O requests using to access LUs on their respective storage systems. In some embodiments, each DPA may also be configured with the necessary functionality to act as targets, e.g., to reply to I/O requests, such as SCSI commands, issued by other initiators in the SAN, including their respective hosts. In certain embodiments, the DPAs, acting as target nodes, may dynamically expose or remove one or more LUs.

Referring again to FIG. 1, as described herein above, Site I and Site II may each behave simultaneously as a production site and a backup site for different logical units. As such, DPA 112 and DPA 124 may each behave as a source DPA for some LUs, and as a target DPA for other LUs, at the same time.

In the embodiment of FIG. 1, hosts 104 and 116 include protection agents 144 and 164, respectively. Protection agents 144 and 164 are configured to intercept SCSI commands issued by their respective hosts to LUs via host devices (e.g. host devices 140 and 160). A protection agent may act on an intercepted SCSI command issued to a logical unit, in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. A protection agent 144, 164 may handle different SCSI commands, differently, according to the type of the command. For example, a SCSI command inquiring about the size of a certain LU may be sent directly to that LU, whereas a SCSI write command may be split and sent first to a DPA within the host's site.

In various embodiments, a protection agent may change its behavior for handling SCSI commands, for example as a result of an instruction received from the DPA. In certain embodiments, the behavior of a protection agent for a certain host device may depend on the behavior of its associated DPA with respect to the LU of the host device. In some embodiments, when a DPA behaves as a source site DPA for a certain LU, then during normal course of operation, the associated protection agent may split I/O requests issued by a host to the host device corresponding to that LU. In particular embodiments, when a DPA behaves as a target device for a certain LU, then during normal course of operation, the associated protection agent fails I/O requests issued by the host to the host device corresponding to that LU.

Referring back to FIG. 1, communication between a protection agent 144, 164 and its respective DPA 112, 124 may use any protocol suitable for data transfer within a SAN, such as fiber channel, or SCSI over fiber channel. The communication may be direct, or via a logical unit exposed by the DPA.

In certain embodiments, protection agents may be drivers located in their respective hosts. In other embodiments, a protection agent may be located in a fiber channel switch or in any other device situated in a data path between a host and a storage system or on the storage system itself. In some embodiments, the protection agent may run at the hypervisor layer or in a virtual machine providing a virtualization layer.

Referring again to FIG. 1, the target storage system 120 exposes a journal LU 176 for maintaining a history of write transactions made to LU 156, referred to herein as a "journal." The journal may be used to provide access to storage at specified points in time, as discussed further below in conjunction with FIG. 2. In some embodiments, the journal may be stored across multiple LUs (e.g., using striping).

In the embodiment of FIG. 1, the target DPA 124 includes a journal processor 180 for managing the journal within LU 176. The journal processor 180 is configured to manage the journal entries of LU B 156. Specifically, journal processor 180 may enter write transactions received by the target DPA 124 from the source DPA 112 into the journal by writing them into the journal LU 176, read the undo information for the transaction from LU B 156, update the journal entries in the journal LU 176 with undo information, apply the journal transactions to LU B 156, and remove already-applied transactions from the journal.

In one embodiment, the journal processor 180 may be configured to perform processing described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

Embodiments of the data replication system may be provided as physical systems for the replication of physical LUs, or as virtual systems for the replication of virtual LUs. In one embodiment, a hypervisor may consume LUs and may generate a distributed file system on the logical units such as VMFS, for example, generates files in the file system and exposes the files as LUs to the virtual machines (each virtual machine disk is seen as a SCSI device by virtual hosts). In another embodiment, a hypervisor may consume a network based file system and exposes files in the NFS as SCSI devices to virtual hosts.

Referring back to FIG. 1, in normal operation (sometimes referred to as "production mode"), the DPA 112 acts as a source DPA for LU 136 ("LU A"). Thus, protection agent 144 is configured to act as a source protection agent, specifically by splitting I/O requests to host device 140 ("Device A"). The protection agent 144 may send an I/O request to source DPA 112 and, after receiving an acknowledgement therefrom, may send the I/O request to LU 136. After receiving a second acknowledgement from storage system 108, the host 104 may acknowledge that the I/O request has successfully completed.

When source DPA 112 receives a replicated I/O request from protection agent 144, source DPA 112 may transmit certain I/O information characterizing the write request, packaged as a "write transaction", over WAN 128 to the target DPA 124 for journaling and for incorporation within target storage system 120. When applying write operations to storage system 120, the target DPA 124 may act as an initiator, and may send SCSI commands to LU 156 ("LU B").

The source DPA 112 may send its write transactions to target DPA 124 using a variety of modes of transmission, including inter alia (i) a synchronous mode, (ii) an asynchronous mode, and (iii) a batch mode. In synchronous mode, the source DPA 112 may send each write transaction to the target DPA 124, may receive back an acknowledgement from the target DPA 124, and in turns may send an acknowledgement back to protection agent 144.

In synchronous mode, protection agent 144 may wait until receipt of such acknowledgement before sending the I/O request to LU 136. In asynchronous mode, the source DPA 112 may send an acknowledgement to protection agent 144 upon receipt of each I/O request, before receiving an acknowledgement back from target DPA 124.

In batch mode, the source DPA 112 may receive several I/O requests and combines them into an aggregate "batch" of write activity performed in the multiple I/O requests, and may send the batch to the target DPA 124, for journaling and for incorporation in target storage system 120. In batch mode, the source DPA 112 may send an acknowledgement to protection agent 144 upon receipt of each I/O request, before receiving an acknowledgement back from the target DPA 124.

As discussed above, in normal operation, LU B 156 may be used as a backup of LU A 136. As such, while data written to LU A by host 104 is replicated from LU A to LU B, the target host 116 should not send I/O requests to LU B. To prevent such I/O requests from being sent, protection agent 164 may act as a target side protection agent for host device B 160 and may fail I/O requests sent from host 116 to LU B 156 through host device B 160.

Still referring to FIG. 1, in recovery mode, the target DPA 124 may undo the write transactions in the journal LU 176 so as to restore the target storage system 120 to an earlier state.

Figure 2:
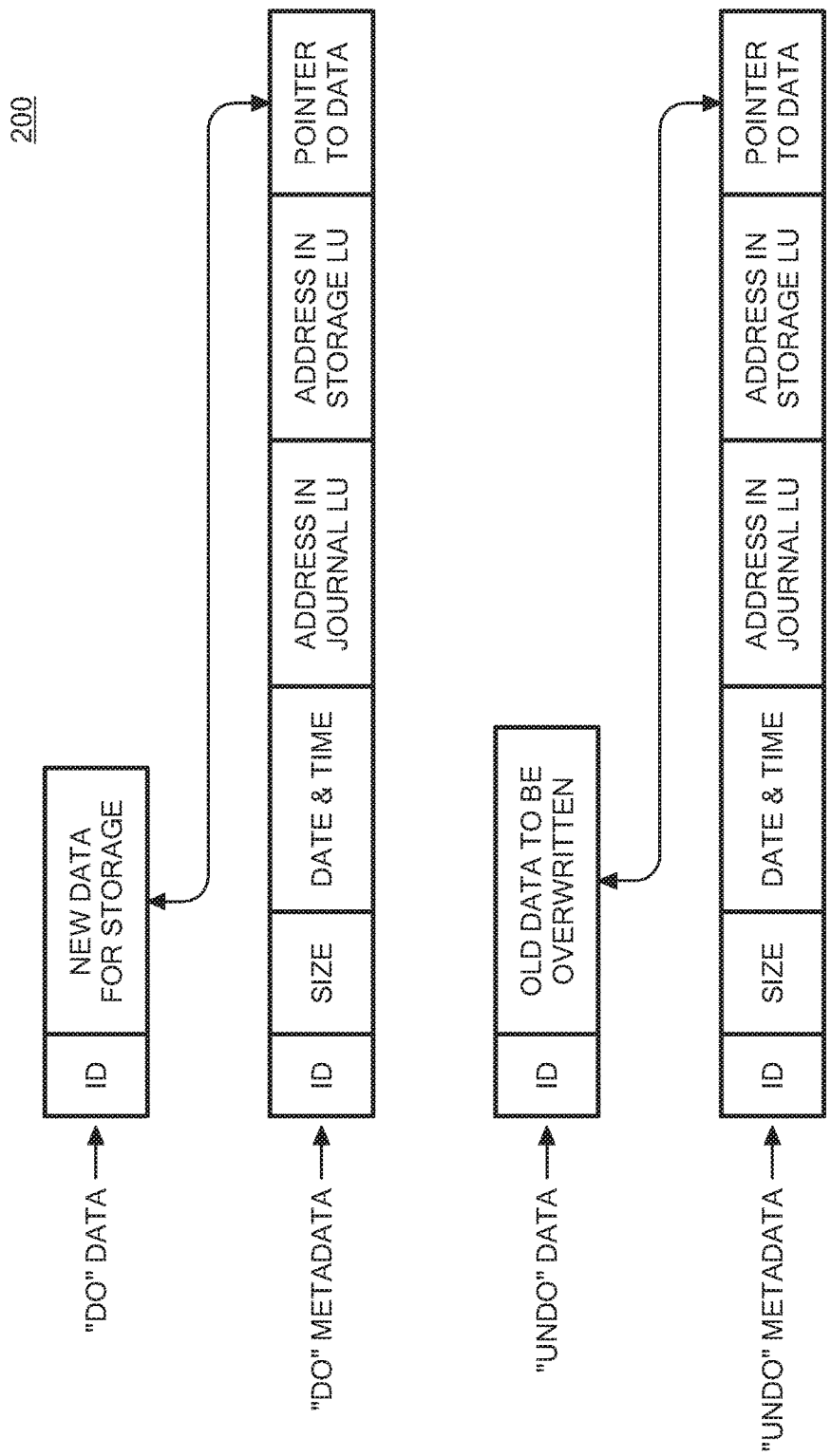
FIG. 2 is a diagram illustrating a journal history of write transactions for a storage system, according to one embodiment of the disclosure.

Referring to the embodiment of FIG. 2, a write transaction 200 may be included within a journal and stored within a journal LU, in accordance with an embodiment. The write transaction 200 includes one or more identifiers; a time stamp indicating the date and time at which the transaction was received by the source DPA; a write size indicating the size of the data block; a location in the journal LU where the data is entered; a location in the target LU where the data is to be written; and the data itself.

Referring briefly to both FIGS. 1 and 2, the transaction 200 may correspond to a transaction transmitted from the source DPA 112 to target DPA 124. The target DPA 124 may record the write transaction 200 in the journal that includes four streams. A first stream, referred to as a "DO" stream, includes a copy of the new data for writing to LU B 156. A second stream, referred to as a "DO METADATA" stream, includes metadata for the write transaction, such as an identifier, a date and time, a write size, the offset within LU B 156 where the new data is written, and a pointer to the offset in the DO stream where the corresponding data is located. A third stream, referred to as an "UNDO" stream, includes a copy of the data being overwritten within LU B 156 (referred to herein as the "old" data). A fourth stream, referred to as an "UNDO METADATA" stream, includes an identifier, a date and time, a write size, a beginning address in LU B 156 where data was (or will be) overwritten, and a pointer to the offset in the UNDO stream where the corresponding old data is located.

Since the journal contains the "undo" information necessary to rollback storage system 120, data that was stored in specific memory locations at a specified point in time may be obtained by undoing write transactions that occurred subsequent to such point in time.

Each of the four streams may hold a plurality of write transaction data. As write transactions are received dynamically by target DPA, the write transactions may be recorded at the end of the DO stream and the end of the DO METADATA stream, prior to committing the transaction.

In some embodiments, a metadata stream (e.g., UNDO METADATA stream or the DO METADATA stream) and the corresponding data stream (e.g., UNDO stream or DO stream) may be kept in a single stream by interleaving metadata and data. In certain embodiments, the metadata streams are used only for auxiliary purposes.

Figure 3:
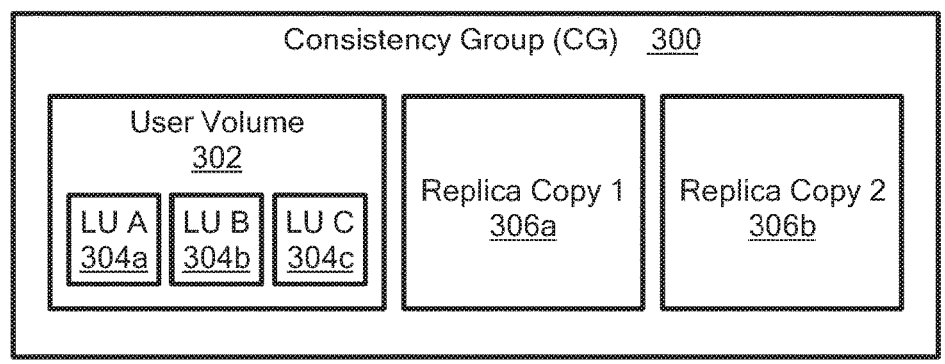
FIG. 3 is a diagram of a consistency group (CG), according to another embodiment of the disclosure.

Referring to FIG. 3, a consistency group 300 includes a user volume 302 and two replica copies 306a and 306b, according to an embodiment of the disclosure. The consistency group 300 includes three LUs 304a-304c across which the user volume 302 is stored. In many embodiments, a consistency group (CG) includes a set of logical units (LUs) that are replicated together and for which write order fidelity is preserved.

I/O writes sent to the user volume 302 are continuously applied to one or more of the replica copies 306. In some embodiments, different replica copies within the same consistency group may have different replication settings. For example, in certain embodiments, two replica copies in the same consistency group may have different replication cycles, different RPOs (Recovery Point Objectives), different snapshot policies, and/or different bandwidth reduction policies.

According to various embodiments, continuous replication to multiple replica copies within the same consistency group may be decoupled from each other using multiple data protection appliances (DPAs); by using more than one DPA, the different copies may be treated independently and load (e.g., I/O load due to journaling) may be distributed across the multiple appliances. In such embodiments, a consistency group (CG) may be referred to as a distributed consistency group (DCG).

Figure 4:
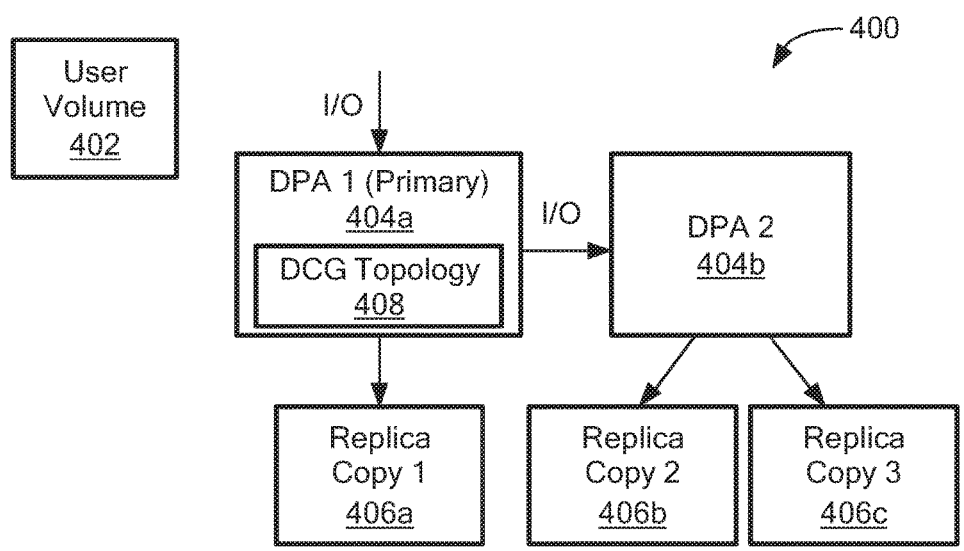
FIG. 4 is a diagram of a data protection system using a distributed consistency group (DCG), according to an embodiment of the disclosure.

Referring to FIG. 4, a data protection system 400 may use a distributed consistency group (DCG) to distribute load, according to an embodiment of the disclosure. The data protection system 400 includes a user volume 402, a plurality of data protection appliances (DPAs) 404, and a plurality of replica copies 406. The user volume 402 and the replica copies may form a DCG, meaning that I/O writes to the user volume 402 may be continuously replicated to each replica copy 406, with write order preserved.

Each DPA 404 may be responsible for maintaining one or more of the replica copies 406, along with a corresponding journal. One of the DPAs (referred to herein as the "primary DPA") receives all I/Os for the user volume 402 and sends the I/Os to other DPAs (referred to herein as the "secondary DPAs") that are responsible for maintaining replica copies within a DCG. In some embodiments, the primary DPA receives I/Os from a splitter (e.g., splitter 144 in FIG. 1). In the embodiment of FIG. 4, the data protection system 400 includes a primary DPA 404a responsible for maintaining one replica copy 406a, and a secondary DPA 404b responsible for maintaining two replica copies 406b, 406c.

In a particular embodiment, a DCG may support up to four (4) replica copies. In certain embodiments, four (4) DPAs may be assigned to a single DCG. In particular embodiments, each DPA assigned to the CG may be responsible for maintaining a single replica copy, i.e., each DPA may be responsible for continuously replicating the user volume to a single replica copy. In one embodiment, the primary DPA does not maintain any replica copies for the DCG (e.g., the primary DPA may be primarily responsible for forwarding I/Os to secondary DPAs).

Referring back to the embodiment of FIG. 4, the primary DPA 404a stores information 408 describing the topology of the distributed consistency group. In certain embodiments, the primary DPA may store a list of secondary DPAs within the DCG, along with information about which DPAs are responsible for maintaining to which replica copies.

Referring again to the embodiment of FIG. 4, the primary DPA 404a may be local to, or remote from, the user volume 402. For example, referring to both FIGS. 1 and 4, the user volume 402 may correspond to LUs within source storage array 108, and primary DPA 404a may correspond to either the source DPA 112 or the target DPA 124. The second DPA 404b may be local to, or remote from, the primary DPA 404a. In one embodiment, the primary DPA and the secondary DPAs are all collocated within a single datacenter or site.

In various embodiments, each DPA can operate independent of any other DPA. For example, each DPA may maintain a complete and independent journal for every replica copy it is responsible for. In other embodiments, there may be some coordination between different DPAs. For example, a so-called "virtual consistency group" may be used to coordinate replication across multiple DPAs. In some embodiments, a virtual CG may be formed that includes several internal CGs. In certain embodiments, a virtual CG may be presented to the user and the user may be able to perform all actions on the virtual CG, wherein each internal CG may replicate a subset of the replica copies. In some embodiments, the internal CGs may not be exposed to the user and all actions happen automatically on the internal CGs when performed on the virtual CG. In certain embodiments, the distributed storage system may use structures and techniques described in U.S. Pat. No. 8,478,955 to provide virtual CGs.

Figure 5:
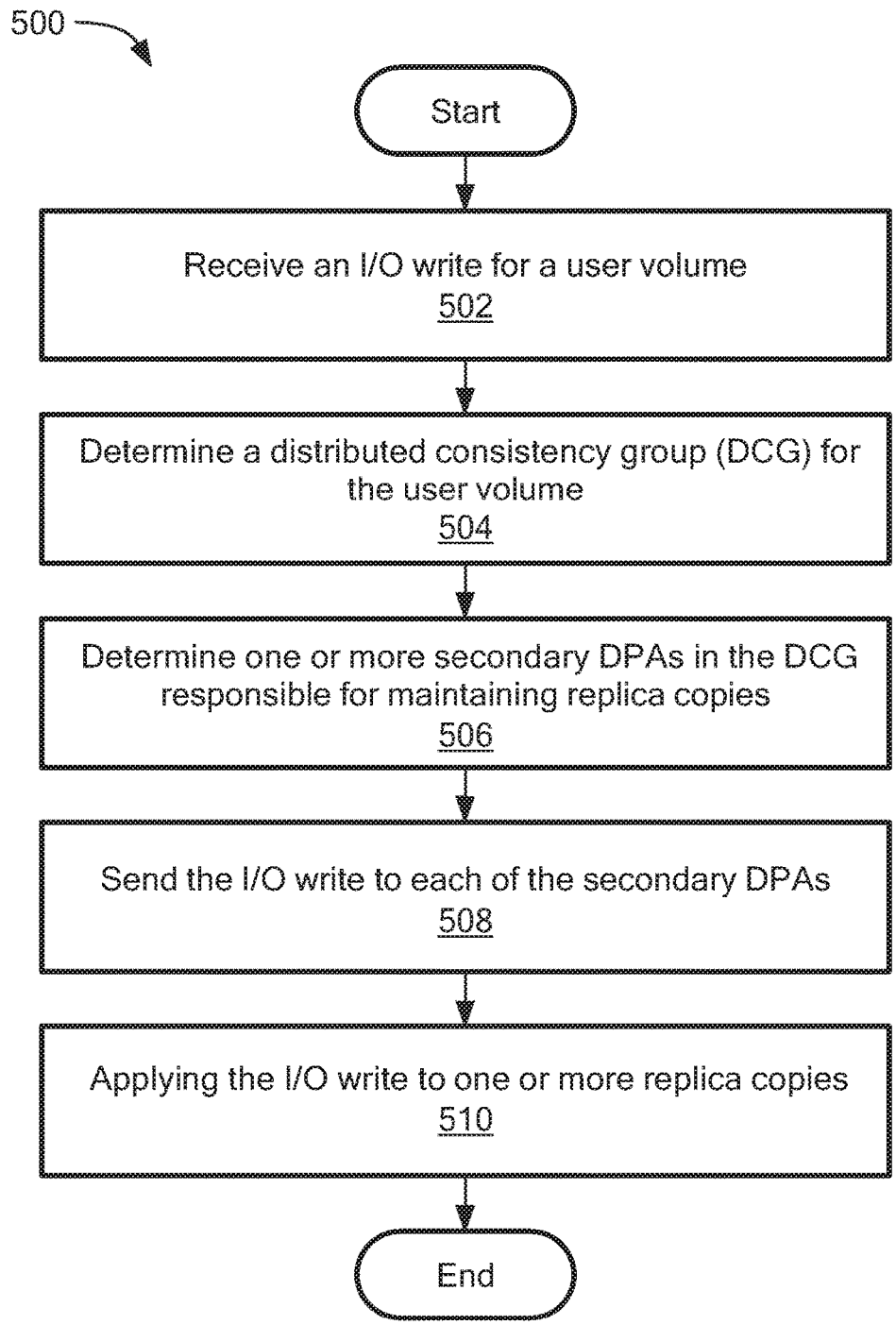
FIG. 5 is flow diagram of a method for load balancing multi-copy data replication, according to embodiments of the disclosure.

FIG. 5 is a flow diagram showing illustrative processing that can be implemented within data protection system (e.g., data protection system 100 of FIG. 1). Rectangular elements (typified by element 502), herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring to FIG. 5, a method 500 can be used to load balance multi-copy data replication, according to an embodiment of the disclosure. At block 502, an I/O write for a user volume is received at a primary DPA. In some embodiments, the I/O write may be received from a splitter within a production host (i.e., a host or VM that stores data within the user volume).

Referring back to FIG. 5, at block 504, a distributed consistency group (DCG) is determined for the user volume. The DCG includes information about one or more replica copies. At block 506, one or more secondary DPAs responsible for maintaining the DCG replica copies are determined. In some embodiments, the secondary DPAs are determined using topology information about the DCG stored in the primary DPA (e.g., topology information 408 in FIG. 4).

Referring again to FIG. 5, at block 508, the I/O write is sent from the primary DPA to each of the secondary DPAs. At block 510, each of the secondary DPAs may apply the I/O write to the DCG replica copies for which it is responsible. In some embodiments, this includes writing the I/O to a journal associated with a replica copy. In various embodiments, the secondary DPAs may further send I/O write data to a remote DPA (e.g., a DPA located at a remote site).

Figure 6:
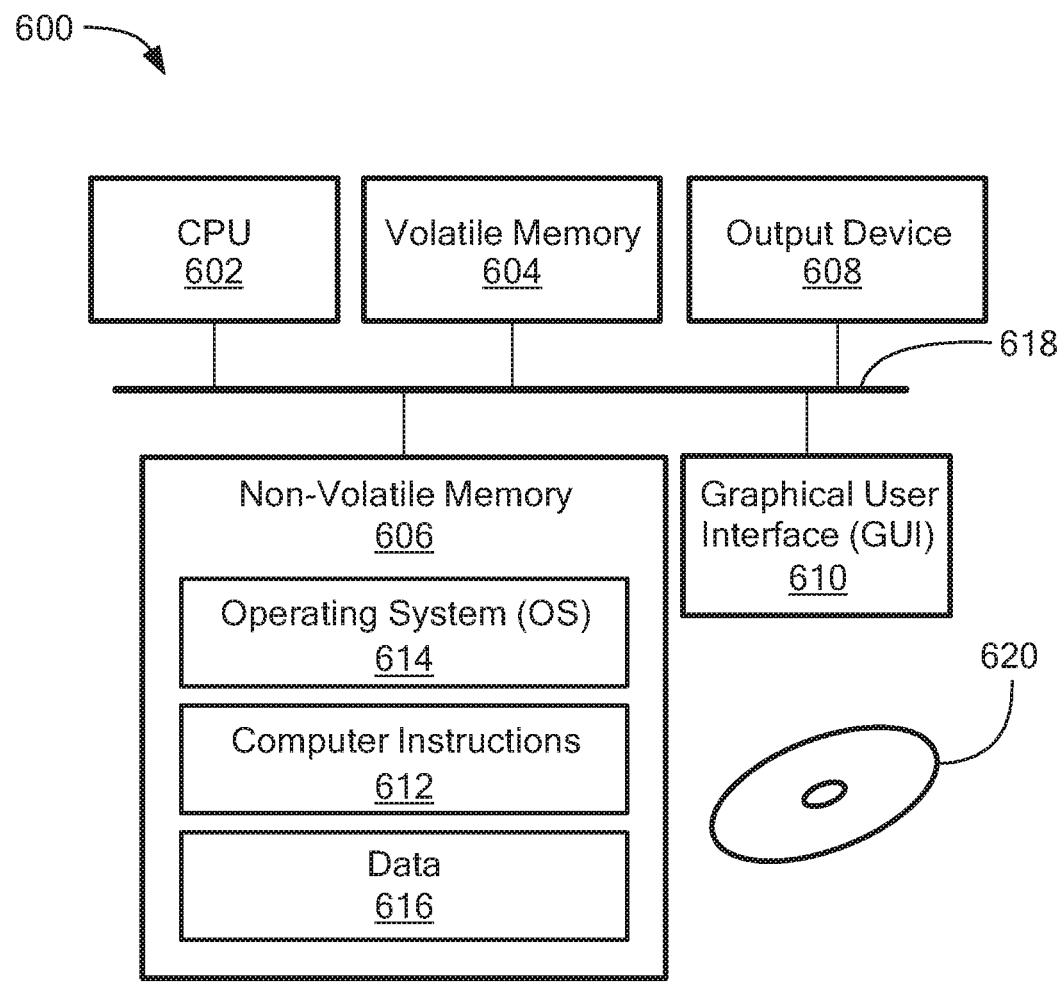
FIG. 6 is a block diagram of a computer on which the method of FIG. 5 may be implemented, according to an embodiment of the disclosure.

FIG. 6 shows a computer 600 that can perform at least part of the processing described herein, according to one embodiment. The computer 600 may include a processor 602, a volatile memory 604, a non-volatile memory 606 (e.g., hard disk), an output device 608 and a graphical user interface (GUI) 610 (e.g., a mouse, a keyboard, a display, for example), each of which is coupled together by a bus 618. The non-volatile memory 606 may be configured to store computer instructions 612, an operating system 614, and data 616. In one example, the computer instructions 612 are executed by the processor 602 out of volatile memory 604. In one embodiment, an article 620 comprises non-transitory computer-readable instructions. In some embodiments, the computer 600 corresponds to a virtual machine (VM). In other embodiments, the computer 600 corresponds to a physical computer.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method comprising:
 receiving, at a primary data protection appliance (DPA), an I/O write for a user volume;
 determining a distributed consistency group (DCG) associated with the user volume, the DCG having a plurality of replica copies that are associated with the user volume;
 determining a plurality of secondary data protection appliances (DPAs) that are configured to maintain one or more of the replica copies, each of the secondary DPAs being configured to maintain a different respective one of the replica copies and a different respective journal associated with the respective replica copy, such that at least two of the secondary DPAs are configured to maintain the DPAs respective replica copies in accordance with different replication settings;

sending the I/O write from the primary DPA to each of the secondary DPAs; and executing the I/O write by at least some of the secondary DPAs, wherein executing the I/O write by any of the secondary DPAs includes adding the I/O write to the respective journal that is maintained by that secondary DPA.

2. The method of claim 1 wherein applying the I/O write to at least one of the replica copies comprises adding the I/O write to a journal.

3. The method of claim 1 wherein the at least two secondary DPAs are configured to maintain the DPAs respective replica copies in accordance with different replication cycles.

4. The method of claim 1 further comprising:
applying the I/O write to one or more replica copies assigned to the primary DPA.

5. The method of claim 1 wherein the DCG includes N replica copies and wherein determining one or more secondary DPAs assigned to one or more of the replica copies comprises determine N−1 secondary DPAs each assigned to one of the replica copies.

6. The method of claim 1 further comprising:
sending the I/O write from at least one of the secondary DPAs to a remote DPA.

7. A system comprising:
one or more processors;
a volatile memory; and
a non-volatile memory storing computer program code that when executed on the processor causes execution across the one or more processors of a process operable to perform the operations of:
receiving an I/O write for a user volume;
determining a distributed consistency group (DCG) associated with the user volume, the DCG having a plurality of replica copies that are associated with the user volume;
determining at least two data protection appliances (DPAs) that are configured to maintain replica copies of the user volume in accordance with different replication settings, each of the DPAs being configured to maintain a different respective one of the replica copies and a different respective journal associated with the respective replica copy;
sending the I/O write to each of the DPAs; and
applying the I/O write to the replica copies maintained by the DPAs.

8. The system of claim 7 wherein applying the I/O write to at least one of the replica copies comprises adding the I/O write to a journal.

9. The system of claim 7 wherein receiving an I/O write for a user volume comprises receiving an I/O write from a splitter.

10. The system of claim 7 wherein the process is further operable to perform the operation of applying the I/O write to one or more replica copies that is stored in the non-volatile memory.

11. The system of claim 7 wherein the DCG includes N replica copies and wherein determining one or more DPAs assigned to one or more of the replica copies comprises determine N−1 DPAs each assigned to a different one of the replica copies.

12. The system of claim 7 wherein the computer program code causes execution of a process further operable to perform the operations of:
sending the I/O write from a least one of the DPAs to a remote DPA.

13. A system for distributing load due to journaling, comprising:
a primary data protection appliance (DPA) operatively coupled to a plurality of secondary DPAs to form a data consistency group (DPG), the primary DPA being configured to receive an I/O write for a user volume, identify the plurality of secondary DPAs as maintaining replica copies of the user volume, and forward the I/O write to the secondary DPAs;

wherein each of the secondary DPAs is configured to maintain a different respective replica copy of the user volume and a respective journal for modifying that replica copy;

wherein each of the secondary DPAs is configured to receive the I/O write from the primary DPA, and execute the I/O write by at least adding the I/O write to the respective journal that is maintained by that secondary DPA; and wherein at least two of the secondary DPAs are configured to execute the I/O write in accordance with one or more different replication settings.

14. The system of claim 13, wherein the secondary DPAs are coupled to the primary DPA via a communications network, and each of the secondary DPAs includes a different physical device comprising at least one processor operatively coupled to a memory.

15. The system of claim 13, wherein executing the I/O write in accordance with one or more different replication settings includes executing the I/O write in accordance with different replication cycles.

16. The system of claim 13, wherein executing the I/O write in accordance with one or more different replication settings includes executing the I/O write in accordance with different Recovery Point Objectives.

17. The system of claim 13, wherein executing the I/O write in accordance with one or more different replication settings includes executing the I/O write in accordance with different snapshot policies.

18. The system of claim 13, wherein executing the I/O write in accordance with one or more different replication settings includes executing the I/O write in accordance with different bandwidth reduction policies.

* * * * *